United States Patent [19]

Samejima et al.

[11] Patent Number: 5,457,947
[45] Date of Patent: Oct. 17, 1995

[54] MULCHING MOWER UNIT

[75] Inventors: Kazuo Samejima; Junji Miyata; Mitsuhiro Matsuyama; Minoru Kyotani; Masaji Kure; Hideo Okura, all of Sakai, Japan

[73] Assignee: Kubota Corporation, Osaka, Japan

[21] Appl. No.: 355,446

[22] Filed: Dec. 12, 1994

Related U.S. Application Data

[63] Continuation of Ser. No. 87,040, Jul. 1, 1993, abandoned.

[30] Foreign Application Priority Data

| Jul. 2, 1992 | [JP] | Japan | 4-175177 |
| Jul. 30, 1992 | [JP] | Japan | 4-203422 |
| Jul. 31, 1992 | [JP] | Japan | 4-204672 |

[51] Int. Cl.$^6$ ................................. A01D 55/18
[52] U.S. Cl. .................... 56/16.7; 56/17.5; 56/320.1; 56/320.2; 56/DIG. 17; 56/DIG. 20
[58] Field of Search ................... 56/16.9, 13.4, 56/13.7, 13.8, 17.4, 17.5, 255, 295, 320.1, 320.2, 502, 503

[56] References Cited

U.S. PATENT DOCUMENTS

| 2,992,524 | 7/1961 | Stabnau | 56/320.1 |
| 4,577,455 | 3/1986 | Amano et al. | 56/17.1 |
| 5,133,176 | 7/1992 | Baumann et al. | 56/17.4 |
| 5,191,756 | 3/1993 | Kuhn | 56/17.5 |
| 5,205,112 | 4/1993 | Tillotson et al. | 56/2 |
| 5,212,938 | 5/1993 | Zenner et al. | 56/320.1 |
| 5,251,430 | 10/1993 | Matsumoto et al. | 56/17.5 |

OTHER PUBLICATIONS

Advertising brochure entitled "Versadeck Convertible Mulching Mower" Ransomes Inc., 1991.

*Primary Examiner*—Ramon S. Britts
*Assistant Examiner*—Pamela A. O'Connor
*Attorney, Agent, or Firm*—Jordan and Hamburg

[57] ABSTRACT

A mower unit includes a housing having a skirt portion extending toward the ground, and a covering wall surrounding a plurality of grass cutting blades to define spaces for mulching treatment. The covering wall includes peripheral wall members each curved along a locus of revolution of the blade and spaced from the skirt portion. The peripheral wall member includes a vertical portion descending toward the ground. The vertical portion and the skirt portion have lower ends thereof substantially at the same height over the ground. The blades are arranged transversely of the mower unit. The peripheral wall members are in the form of independent annular wall members provided for the blades, respectively. The annular wall members define spaces for mulching treatment substantially independent of one another. Alternatively, the peripheral wall members may be in the form of annular wall members corresponding to loci of revolution of the blades, respectively, and an adjacent pair of the annular wall members may have at least parts of peripheries overlapping each other. The parts of peripheries are cut so that the spaces of mulching treatment defined by the pair of annual wall members communicate with each other.

8 Claims, 7 Drawing Sheets

MULCHING MOWER UNIT

This application is a continuation of application Ser. No. 08/087,040 filed Jul. 1, 1993, now abandoned.

BACKGROUND OF THE INVENTION

The present invention relates to mower units movable over the ground to cut grass, and particularly to a mower unit capable of mulching treatment to cut grass with mower blades, chop the grass clippings with the same blades a plurality of times to reduce the grass to small fragments, and scatter the fragments over the ground.

Figure 9:
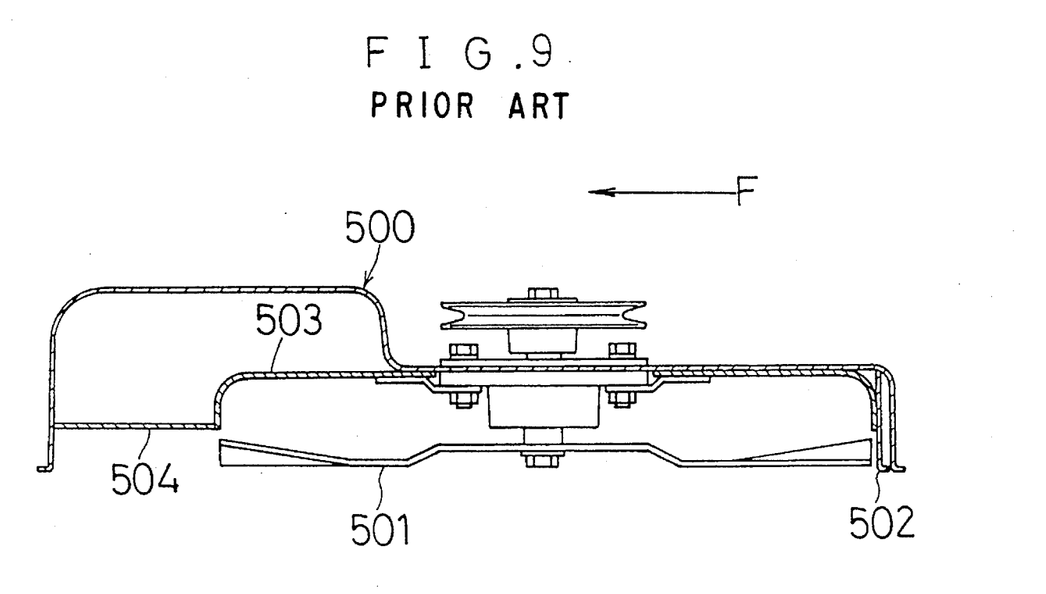
FIG. 9 is a view corresponding to FIG. 3 and showing a mower unit in the prior art.

Such a mower unit may be the side discharge type which discharges grass clippings from one side thereof as entrained on air flows generated by the blades. As shown in FIG. 9, this mower unit includes a housing 500 having coverings extending along an inner ceiling wall thereof to lie close to and surround loci of revolution of blades 501 formed of bars. The coverings define spaces for use in the mulching treatment. Each covering includes a vertical wall 502 formed at a rear end of the mower unit with respect to a running direction: F, i.e. at the righthand side in the drawing, a ceiling potion 503 extending horizontally over the blade 501, and a connecting portion 504 bent downward from the ceiling portion 503 and bent again to extend horizontally to be connected to a forward skirt portion of the housing 500. Normally, a mower unit not designed for mulching treatment also includes a vertical wall forming part of such covering to act as a guide wall at the rear end of the housing to guide air flows generated by each blade, so that the air flows efficiently transport grass clippings. Thus, the vertical wall may be permanently fixed to the housing, while the ceiling and connecting portions are adapted to be removable from the housing. This will render the mower unit selectively usable as the side discharge type and the mulching treatment type.

If the connecting portion of each covering defining the space for mulching treatment had a small height over the ground, the horizontal surface of the connecting portion would push over upstanding grass before the grass reaches the blade. The grass pushed over and reaching an operating region of the blade would not be cut sufficiently. In conventional practice, therefore, the connecting portion is designed to have a certain height over the ground. This produces some space between the horizontal surface and the ground. However, in the course of entry of grass clippings to the space for mulching treatment to be reduced to small grass fragments, parts of the grass clippings may escape through the space between the horizontal surface and the ground. Thus, these part of the grass clippings, remaining long without being reduced to small fragments, mix into patches of grass on the ground.

SUMMARY OF THE INVENTION

An object of the present invention is to provide a mower unit capable of reliably carrying out mulching treatment.

The above object is fulfilled, according to the present invention, by a mower unit including a housing having a skin portion extending toward the ground, and a covering wall surrounding a plurality of bar blades to define spaces for mulching treatment. The covering wall includes peripheral wall members each curved along a locus of revolution of the blade and spaced from the skirt portion. The peripheral wall member includes a vertical portion descending toward the ground. The vertical portion and the skirt portion have lower ends thereof substantially at the same height over the ground.

With such a covering wall, grass cut by the bar blades, during a mulching operation, is retained in the spaces for mulching treatment by air flows generated and directed upward by the bar blades. The grass is then chopped a plurality of times by the bar blades to become small fragments. As noted above, the vertical portions of the peripheral wall members and the skirt portion have lower ends thereof substantially at the same height over the ground. This minimizes escape of grass clippings outwardly of the mower unit and to optimize the function to reduce the grass clippings to small fragments. Moreover, since spaces are secured between the peripheral wall members and skirt portion, grass standing on the ground is pushed over only temporarily by the peripheral wall members extending vertically. The grass regains the upstanding posture before reaching operating regions of the blades. This assures reliability of the function of the blades to cut grass standing on the ground.

In a preferred embodiment of the invention, a guide plate is opposed to and disposed in a region above each blade for guiding grass clippings cut by the blade toward the center of revolution of the blade. Preferably, the guide plate is curved to extend from a radially outward position to a radially inward position with respect to the locus of revolution of the blade.

With this construction, grass clippings cut by each blade are blown upward by upwardly directed circulating air flows generated by finning action of the blade. Then, the clippings are guided toward the center of revolution by the curved guide plate to be cut to small fragments by inward edge portions of the blade. This enhances the efficiency of reducing grass to small fragments.

In a further preferred embodiment of the invention, each of the peripheral wall members includes a plurality of slits opening downward and arranged at small intervals in at least a portion of the peripheral wall member to allow passage of grass. The slits are formed at small intervals in each peripheral wall member, particularly in the vertical portion thereof, disposed adjacent the locus of revolution of outer ends of the blade. This construction allows upstanding grass to pass through the slits, thereby reducing the possibility of the grass being pushed over to a forwardly inclined posture, which further promotes reliability of the function to cut grass standing on the ground.

Other features and advantages of the invention will be apparent from the following description of the preferred embodiments to be taken with reference to the accompanying drawings.

DETAILED DESCRIPTION OF THE PREFERRED EMBODIMENTS

The present invention will be described hereinafter as embodied into a mower unit employed on a mid-mount type riding lawn tractor.

Figure 1:
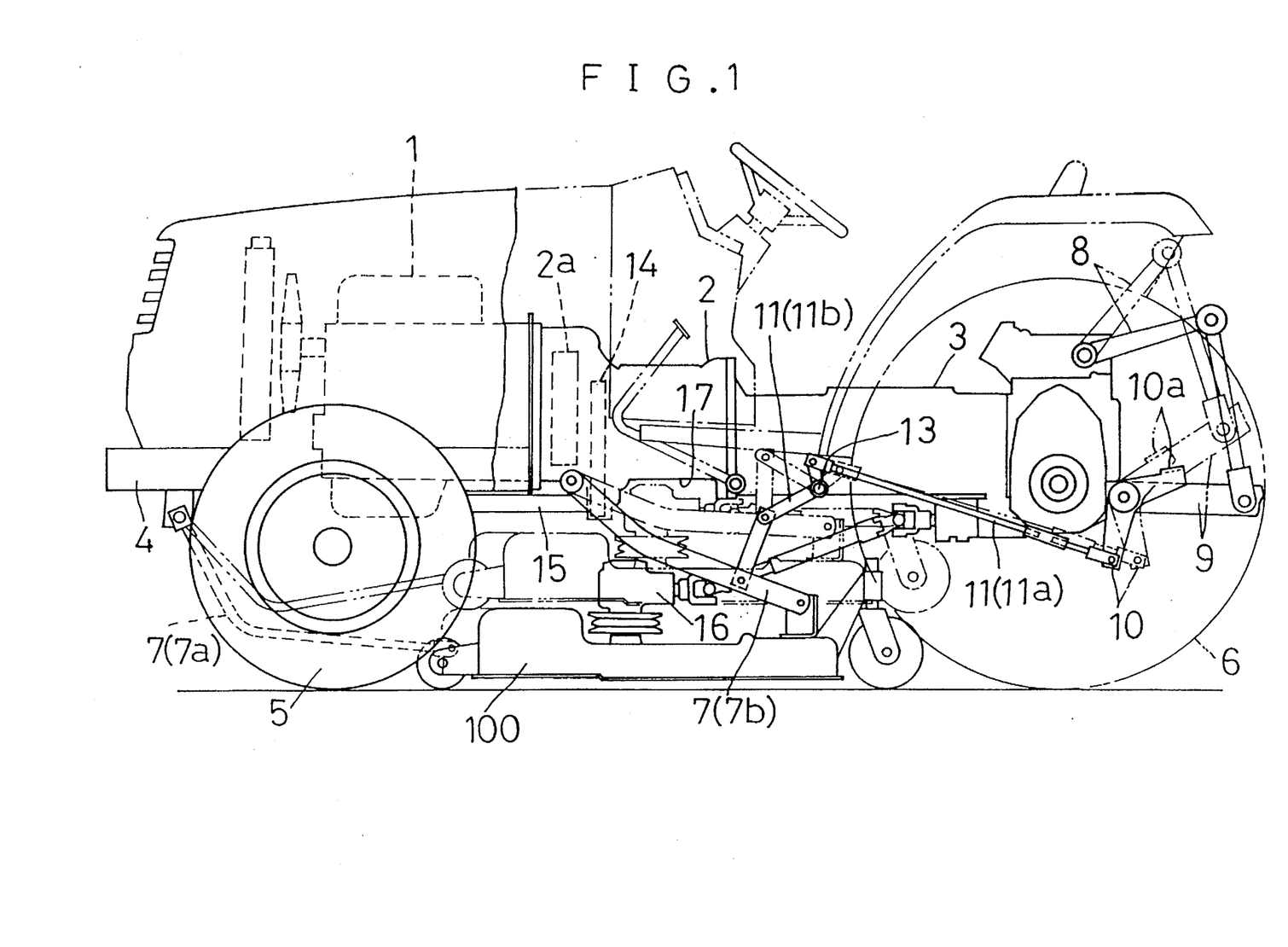
FIG. 1 is a side view of a lawn tractor equipped with a mower unit according to the present invention.

As shown in FIG. 1, the lawn tractor includes an engine 1, a main clutch housing 2 and a propelling transmission case 3 rigidly interconnected to one another. Front wheels 5 support a front frame 4 extending forwardly of the engine 1, while rear wheels 6 support the transmission case 3. A mower unit 100 is vertically movably connected to the tractor through a parallel link mechanism 7 between the front wheels 5 and rear wheels 6. The mower unit 100 is pivotally connected to the tractor through front links 7a and rear links 7b in a four point parallelogram linkage. The mower unit 100 is driven vertically with vertical movement of a lift arm 8. Specifically, a lower link 9 is vertically movable about a pivotal point by the lift arm 8, and a contact link 10 is mounted pivotable coaxially with the lower link 9 about the same pivotal point. The contact link 10 includes a contact piece 10a for contacting an upper surface of the lower link 9. The contact link 10 is connected to an intermediate position of one of the rear links 7b through a link mechanism 11 including a rod 11a and an L-shaped link 11b.

The rear links 7b are pivotally connected to support brackets (not shown) bolted to lateral walls of the clutch housing 2 directly coupled to the engine 1. The L-shaped link 11b of the link mechanism 11 is pivotally connected to a pivotal axis 13 extending through a lower wall portion of the propelling transmission case 3.

The front wheels 5 are driven through a main clutch 2a connected to the engine 1, a reduction gearing 14 mounted in the clutch housing 2, and a front wheel drive transmission shaft 15.

As noted above, the front wheel drive transmission shaft 15 is driven through the reduction gearing 14 mounted in the clutch housing 2. This construction dispenses with a front wheel drive transmission shaft extending from the propelling transmission case 3 disposed rearwardly. The clutch housing 2 has a bottom surface defining a recess 17 for receiving a bevel gear case 16 mounted on an upper surface of the mower unit 100, thereby allowing the mower unit 100 to be raised to an increased extent.

Figure 2:
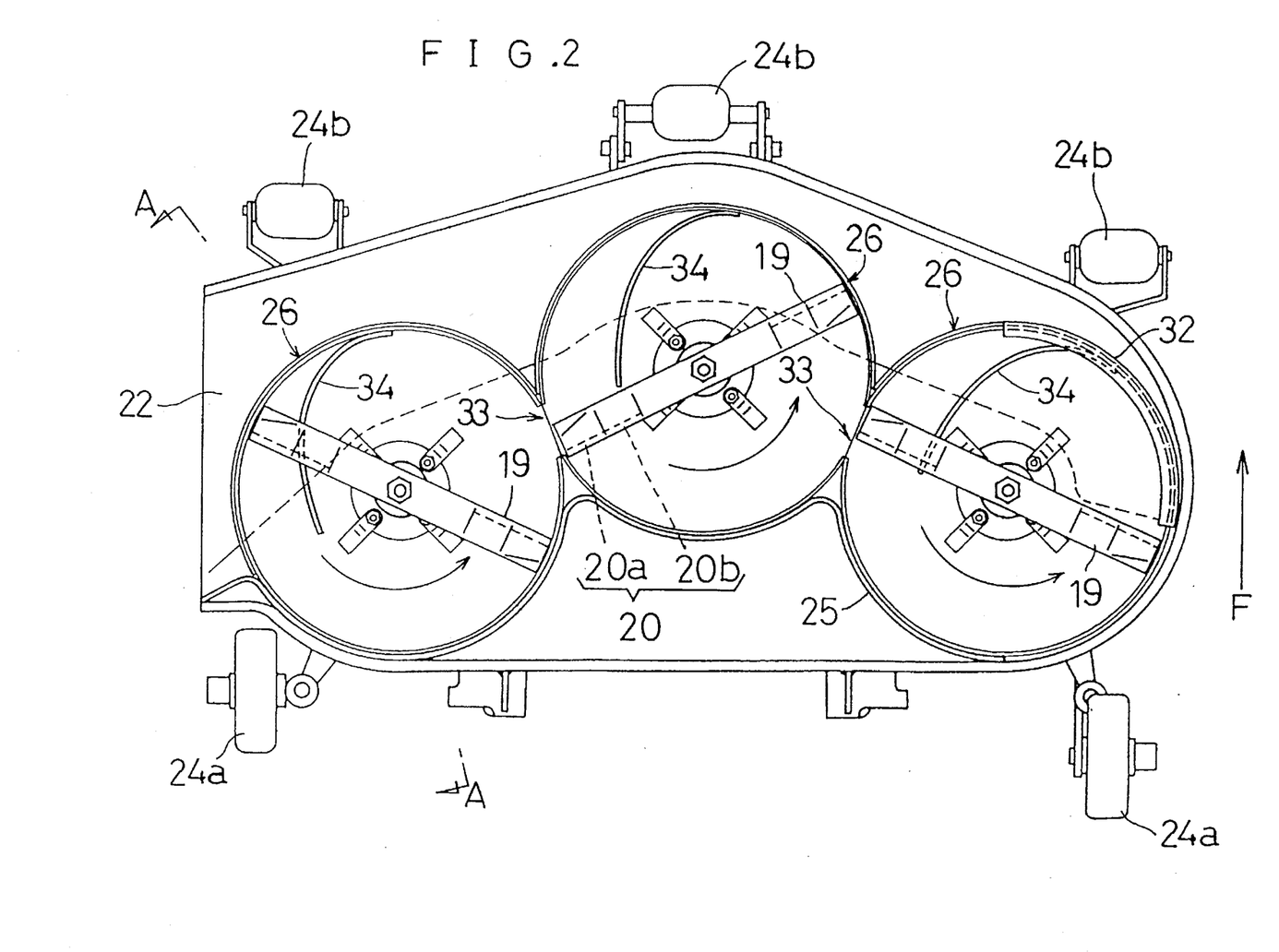
FIG. 2 is a cutaway top view of the mower unit.
Figure 3:
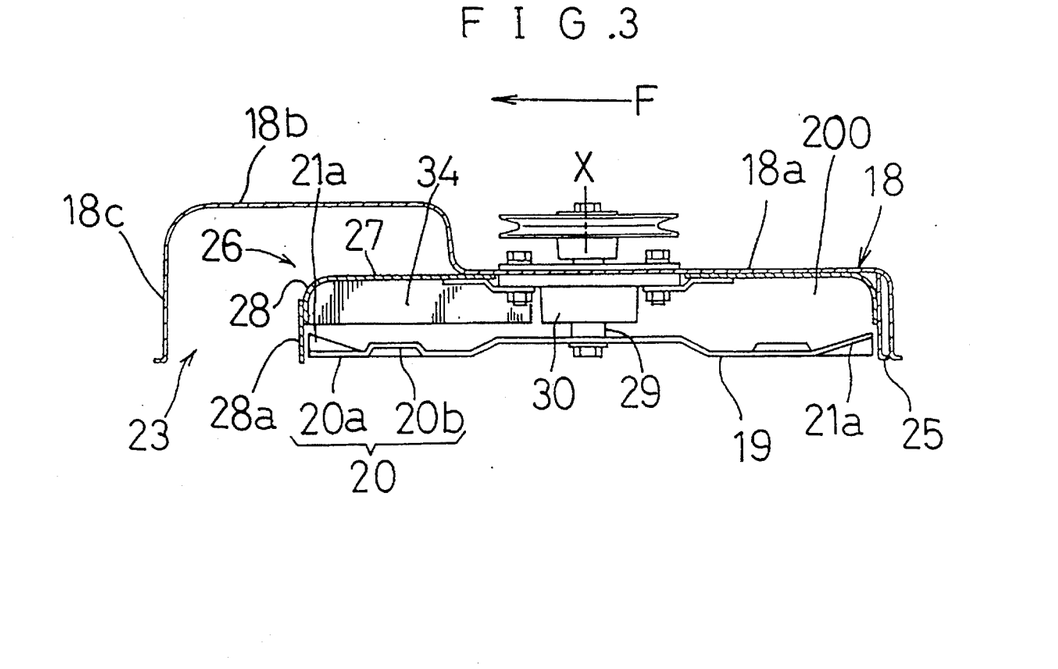
FIG. 3 is a section taken on line A—A of FIG. 2.

As shown in FIGS. 2 and 3, the mower unit 100 includes a blade housing 18 containing three bar blades 19 rotatable about vertical axes X, respectively.

Figure 4:
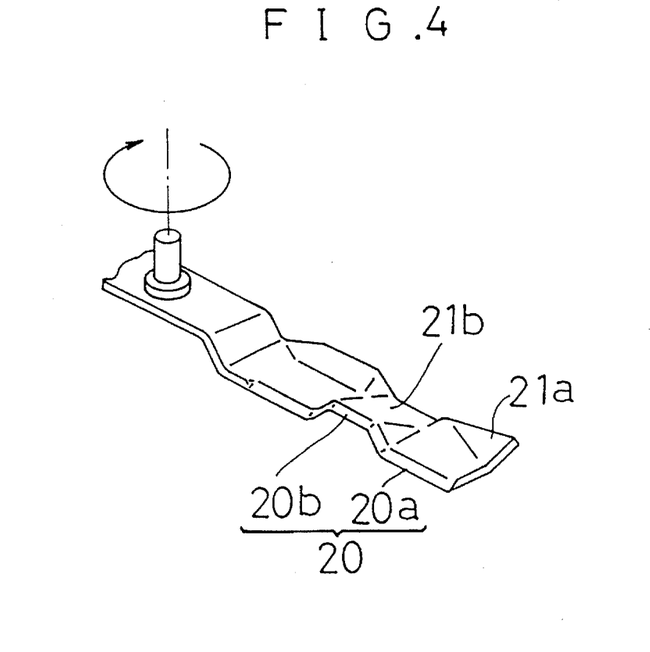
FIG. 4 is an enlarged view of a bar blade.

As shown in FIG. 4, each bar blade 19 has blade edges 20 defined forwardly thereof in a direction of rotation. Each blade edge 20 includes a radially outward edge portion 20a and a radially inward edge portion 20b having different heights. The lower and upper edge portions 20a and 20b act to cut grass to small fragments. Each bar blade 19 further includes fins 21a formed rearwardly of the radially outward edge portions 20a and directed obliquely upward to generate upward air flows with rotation of the blade 19. Each bar blade 19 also includes guide surfaces 21b formed rearwardly of the radially inward edge portions 20b and inclined obliquely downward to generate downward air flows with rotation of the blade 19.

The housing 18 includes a clippings outlet 22 defined in one side thereof. A horizontal ceiling 18a of the housing 18 includes an upwardly bulged portion 18b in a forward region thereof with respect to a running direction: F, i.e. at the left side in FIG. 3. The bulged portion 18b defines a clippings discharge path 23 for use when mulching treatment is not carried out. The ceiling 18a is connected at outer peripheries thereof, excluding a region of the clippings outlet 22, to a skirt portion 18c descending toward the ground. The housing 18 has gauge wheels 24a at right and left rear ends thereof for use in adjusting grass cutting height, and free rotation ground wheels 24b arranged at forward end positions for riding over ridges and the like.

The three bar blades 19 are arranged adjacent one another to have partly overlapping outer loci of revolution as seen in the fore and aft direction of the tractor, to leave no uncut patches of grass. A vertical wall 25 is welded to the ceiling 18a of the housing 18 to extend substantially parallel to the skirt portion 18c. The vertical wall 25 lies along rearward peripheries of the respective bar blades 19 and close to outer loci thereof to prevent air flows generated by the bar blades 19 from leaking outward.

Figure 5:
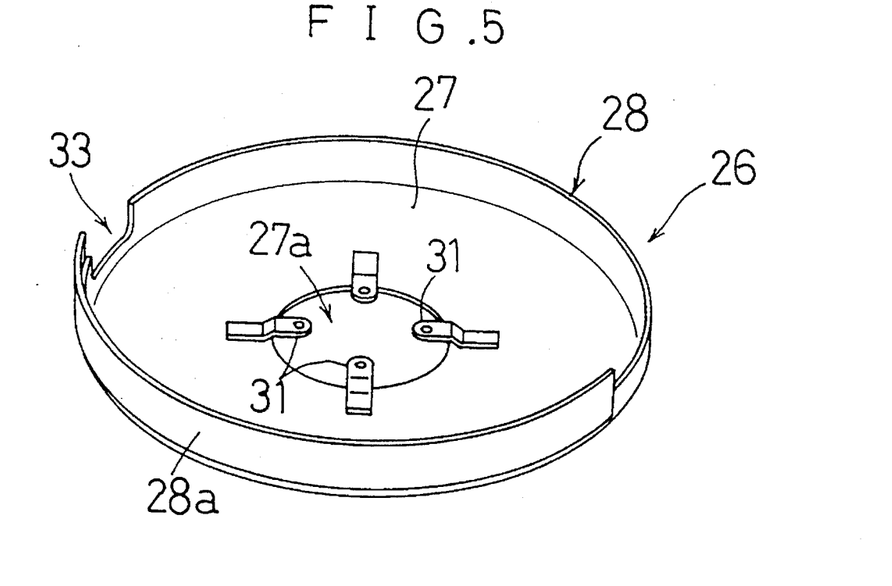
FIG. 5 is a bottom perspective view of a covering.

The mower unit 100 is capable of carrying out a mulching operation to cut grass and reduce the grass to small fragments with the bar blades 19 and to allow the fragments to fall to the ground. For this purpose, the mower unit 100 includes wall means or coverings 26 removably attached to inner surfaces of the housing 18. Each coveting 26 includes a horizontal ceiling wall 27, and a peripheral wall member 28 surrounding substantially an entire circumference adjacent the outer locus of revolution of one bar blade 19. The coveting 26 defines a space for mulching treatment 200. Specifically, as shown in FIG. 5, the ceiling wall 27 defines an opening 27a fitted to a supporting boss 30 (shown in FIG. 3) for rotatably supporting a blade drive shaft 29 (shown in FIG. 3) extending through the ceiling 18a of the housing 18. The ceiling wall 27 has four couplers 31 welded thereto to be bolted tight along with the supporting boss 30 to the ceiling 18a of the housing 18. The peripheral wall member 28 of the covering 26 has a lower end thereof disposed above the bar blade 19 not to interfere with the latter. The vertical wall 25 extends along an outer surface of a rear portion of the peripheral wall member 28. The vertical wall 25 has a lower end at substantially the same level over the ground as a lower end of the skirt portion 18c of the blade housing 18. A vertical member 28a is disposed along an outer surface of a forward portion of each peripheral wall member 28. The vertical member 28a has a lower end at substantially the same level over the ground as the lower end of the skirt portion 18c of the blade housing 18. The vertical member 28a may of course be formed integral with the peripheral wall member 28. Thus, the covering 26 press-worked into a bowl-like shape defines the space for mulching treatment 200 closely along and substantially through the entire circumference of the outer locus of revolution of each bar blade 19 while avoiding interference therewith. The space for mulching treatment 200 permits little leakage of air flows generated by the bar blade 19 to enhance the function to reduce grass clippings to small fragments.

As seen from FIGS. 2 and 3, a curved guide plate 34 is connected to an inner wall of each peripheral wall member 28 to guide grass cut by the radially outward edge portions 20a of the bar blade 19 toward the center of revolution. Consequently, grass cut by the radially outward edge portions 20a of the bar blade 19 is carried toward the center of revolution by upward circulatory air flows generated by the rearward fins 21a and under guiding action of the covering 26 and guide plate 34. Then the grass is cut to smaller fragments by the radially inward edge portions 20b. The resulting grass fragments are discharged downward to clipped patches of grass on the ground under the action of the guide surfaces 21b inclined obliquely downward to generate downward air flows.

The peripheral wall member 28 of the covering 26 remote from the clippings outlet 22 includes a folded portion 32 to prevent grass clippings from leaking laterally outwardly of the mower unit.

The peripheral wall members 28 of the adjacent coverings 26 have cutouts 33 in lower positions thereof where the outer loci of the adjacent bar blades 19 partly overlap each other as seen in the fore and aft direction. This precludes the possibility of outer ends of the bar blades 19 contacting the peripheral wall members 28 due to an assembly error or the like, without hampering mulching performance.

Figure 6:
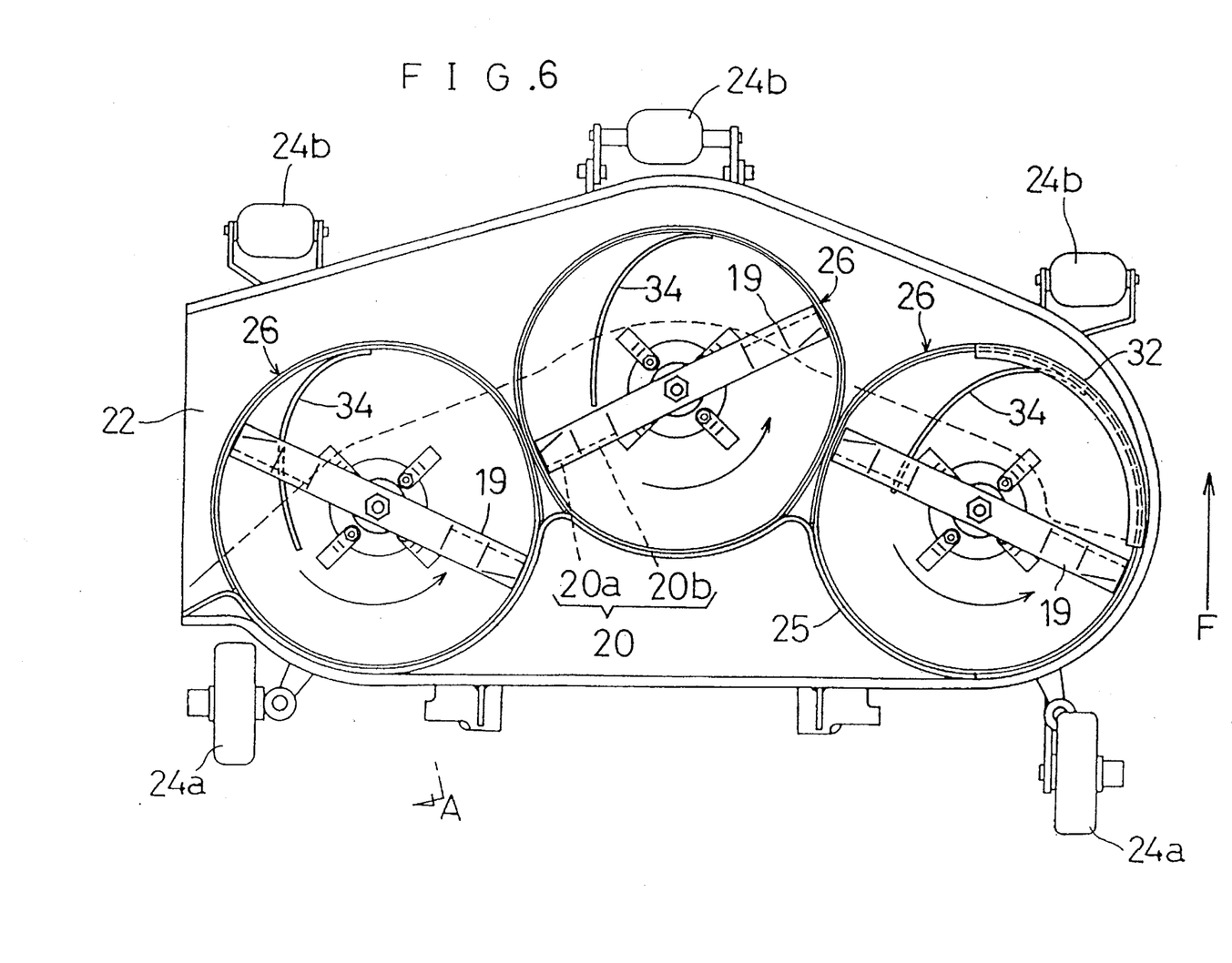
FIG. 6 is a bottom view of a modified mower unit.

However, where adequate space is available, the peripheral wall members 28 of three coverings 26 may be arranged completely independently of one another as shown in FIG. 6. Consequently, the spaces for mulching treatment 200 defined by the respective coverings 28 are completely independent of one another without substantial communication therebetween.

Figure 7:
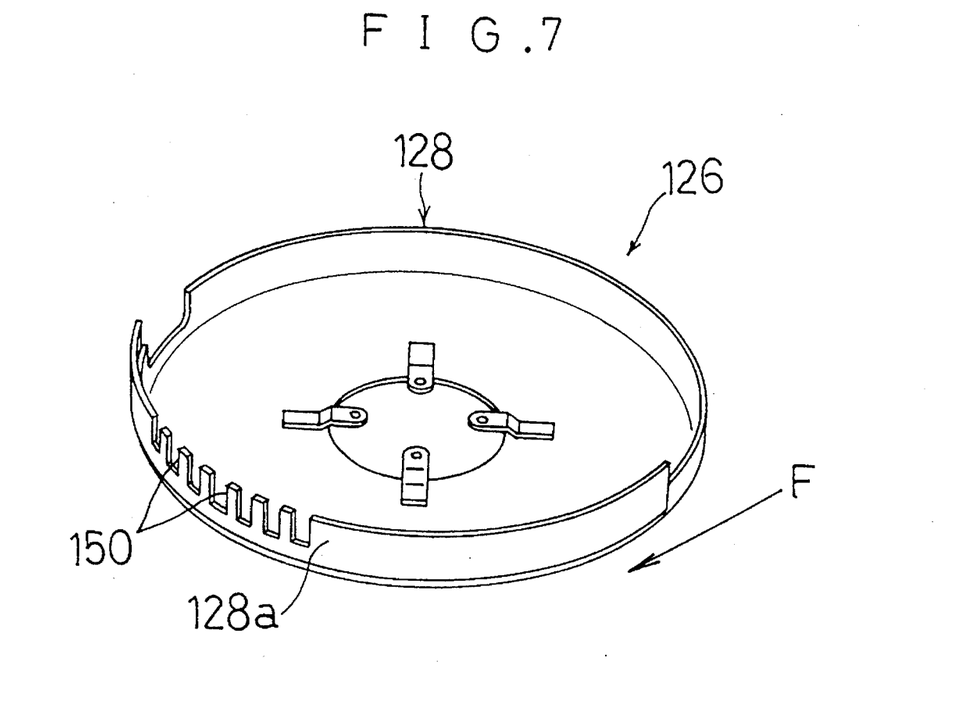
FIG. 7 is a bottom perspective view of a modified covering.

FIG. 7 shows a modified covering 126 which includes a plurality of slits 150 arranged at small intervals in a forward region of a vertical portion 128a of each peripheral wall member 128 with respect to the running direction: F of the mower unit 200 to permit passage of grass standing on the ground. This construction allows grass to remain upright as much as possible to be cut by each bar blade 19.

Figure 8:
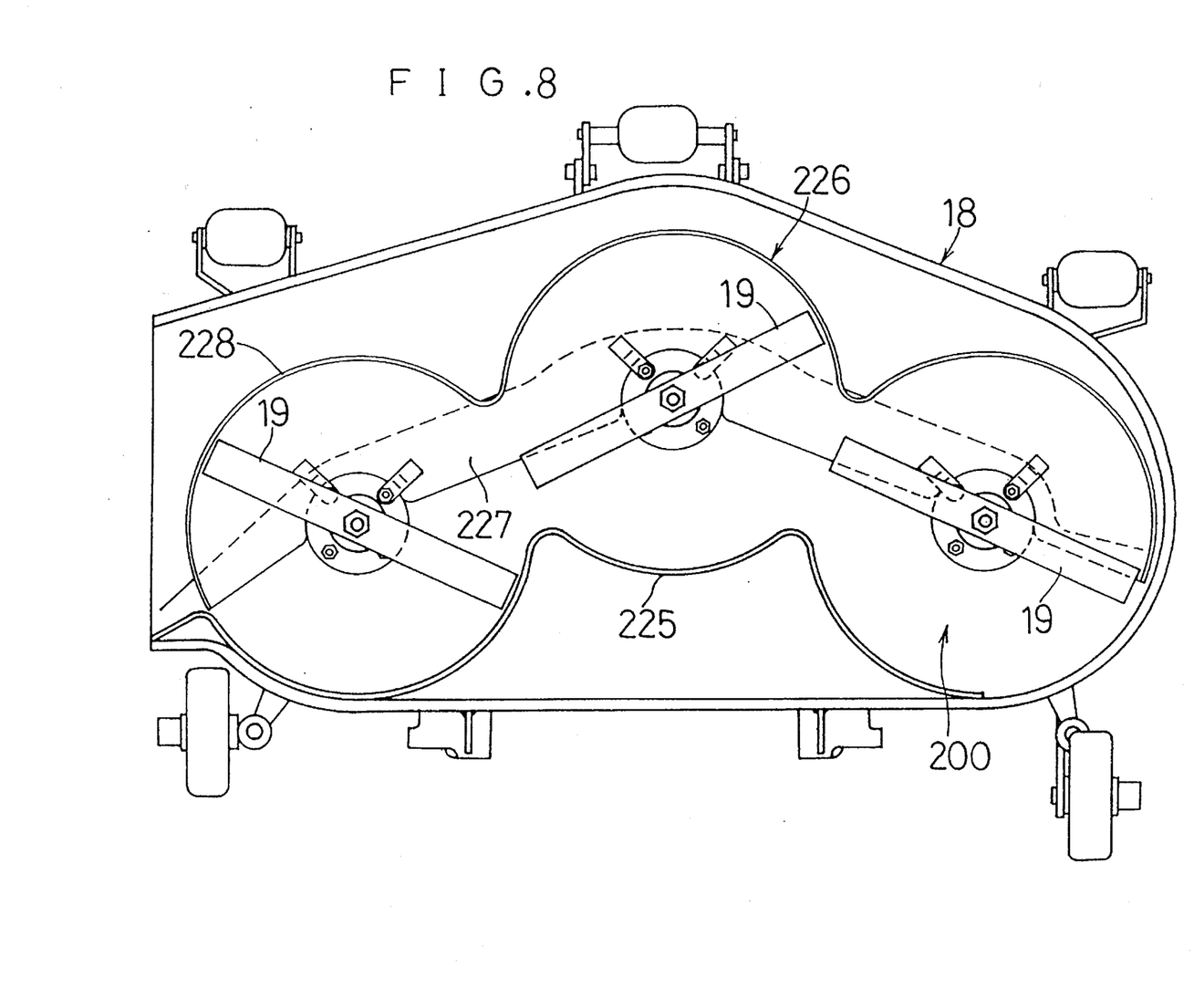
FIG. 8 is a bottom view of a further modified mower unit.

FIG. 8 shows a further modified covering 226 having an integrated structure for enclosing the three bar blades 19. The covering 226 has a peripheral wall member 228 in the form of three interconnected arcs. A ceiling wall 227 is in the form of a horizontal plate member for closing spaces in bulged portions formed in the housing 18. A vertical wall 225 similarly is in the form of three interconnected arcs.

The foregoing embodiments have been described in relation to a mower unit of the side discharge type. However, all of the features of the present invention are applicable also to a mower unit of the rear discharge type which discharges grass clippings rearwardly.

What is claimed is:

1. A mower unit movable over the ground to cut grass, comprising:

blade means driven by external power to cut grass;

a housing for enclosing said blade means, said housing including a horizontal ceiling means and a skirt portion extending vertically from the ceiling toward the ground; and wall means supported by said housing for surrounding said blade means to define a space for mulching treatment, at least a portion of said wall means being removably secured to an inner surface of said housing, said wall means including peripheral wall means curved along a locus of revolution of said blade-means and spaced from said skirt portion, said peripheral wall means being spaced from said skirt portion for insuring a standing position of grass being cut, said peripheral wall means including a vertical portion descending toward the ground, said vertical portion and said skirt portion having lower ends thereof substantially at the same height over the ground for retaining the cut grass in the wall means for reducing the size of the cut grass, a forward portion of said ceiling including an upwardly bulged portion defining a path for clippings discharge from the mower when the mower is operated in a non-mulching mode.

2. A mower unit as defined in claim 1, wherein said blade means includes a plurality of blades arranged transversely of the mower unit, said peripheral wall means including independent annular wall members provided for said blades, respectively, said annular wall members defining spaces for mulching treatment substantially independent of one another.

3. A mower unit as defined in claim 1, wherein said blade means includes a plurality of blades arranged transversely of the mower unit, said peripheral wall means including annular wall members corresponding to loci of revolution of said blades, respectively, an adjacent pair of said annular wall members having at least parts of peripheries overlapping each other, said parts of peripheries being cut so that spaces of mulching treatment defined by said pair of said annual wall members communicate with each other.

4. A mower unit as defined in claim 1, wherein said wall means includes a guide plate opposed to and disposed in a region above said blade means for guiding grass clippings cut by said blade means toward a center of revolution of said blade means.

5. A mower unit as defined in claim 4, wherein said guide plate is curved to extend from a radially outward position to a radially inward position with respect to the locus of revolution of said blade means.

6. A mower unit comprising:

blade means driven by external power to cut grass;

a housing for enclosing said blade means, said housing including a horizontal ceiling and a skirt portion extending vertically from the ceiling toward the ground; and wall means supported by said housing for surrounding said blade means to define a space for mulching treatment, at least a portion of said wall means being removably secured to an inner surface of said housing, said wall means including peripheral wall means curved along a locus of revolution of said blade means and spaced from said skirt portion, said peripheral wall means being spaced from said skirt portion for insuring a standing position of the grass being cut, said peripheral wall means including a vertical portion descending toward the ground, said vertical portion and said skirt portion having lower ends thereof substantially at the same height over the ground for retaining the cut grass in the wall means for reducing the size of the cut grass, the lower ends of said vertical portion and said skirt portion being spaced from said blade means radially outwardly with respect to said blade means for preventing said vertical portion and said skirt portion from interfering with said blade means a forward portion of said ceiling including an upwardly bulged portion defining a path for clippings discharge from the mower when the mower is operated in a non-mulching mode.

7. A mower unit movable over a ground surface to cut grass comprising;

blade means driven by external power to cut grass;

a housing for enclosing said blade means, said housing including a horizontal ceiling and a skirt portion extending vertically from the ceiling toward the ground; and wall means, supported by said housing, for surrounding said blade means for defining a space for mulching, at least a portion of said wall means being removably secured to an inner surface of said housing and including peripheral wall means curved along a locus of revolution of said blade means, a forward part of said peripheral wall means being rearwardly spaced from a forward region of said skirt portion, a forward portion of said ceiling including an upward bulged portion defining a path for clippings discharge from the mower when the mower is operated in a non-mulching mode.

8. The mower unit of claim 7 in which the blade means is rotatable about a fixed vertical axis located rearwardly of the ceiling bulged portion.

* * * * *